United States Patent
Böttger et al.

(10) Patent No.: US 10,460,472 B2
(45) Date of Patent: Oct. 29, 2019

(54) SYSTEM AND METHOD FOR MODEL ADAPTATION

(71) Applicant: MVTec Software GmbH, München (DE)

(72) Inventors: Tobias Böttger, München (DE);
Markus Ulrich, München (DE);
Carsten Steger, Oberschleissheim (DE)

(73) Assignee: UNIVERSITÄT LEIPZIG, Leipzig (DE)

( * ) Notice: Subject to any disclaimer, the term of this patent is extended or adjusted under 35 U.S.C. 154(b) by 215 days.

(21) Appl. No.: 15/649,326

(22) Filed: Jul. 13, 2017

(65) Prior Publication Data
US 2018/0336699 A1  Nov. 22, 2018

(30) Foreign Application Priority Data
May 19, 2017 (EP) .................................... 17172079

(51) Int. Cl.
*G06T 7/73* (2017.01)
*G06K 9/62* (2006.01)
(Continued)

(52) U.S. Cl.
CPC ............... *G06T 7/74* (2017.01); *G06K 9/481* (2013.01); *G06K 9/6202* (2013.01);
(Continued)

(58) Field of Classification Search
CPC .. G06K 9/6206; G06K 9/6255; G06K 9/6202; G06K 9/481; G06K 9/4652;
(Continued)

(56) References Cited

U.S. PATENT DOCUMENTS 6,850,646 B1  2/2005  Silver et al.
7,016,539 B1  3/2006  Silver et al.
(Continued)

FOREIGN PATENT DOCUMENTS

EP  1193642 A1  4/2002
EP  1394727 A1  3/2004
(Continued)

OTHER PUBLICATIONS

D. H. Ballard: Generalizing the Hough transform to detect arbitrary shapes. Pattern Recognition, 13(2): 111-122, 1981.
(Continued)

*Primary Examiner* — Vincent Rudolph
*Assistant Examiner* — Pinalben Patel
(74) *Attorney, Agent, or Firm* — Kagan Binder, PLLC

(57) ABSTRACT

A method for adapting a matching model of an object comprising the step of providing an electronic image of the object; providing a matching model of the object, the matching model consisting of a plurality of points; determining a pose of the object in said electronic image by using a matching approach that uses said matching model; transforming the matching model according to said pose, yielding a transformed model; determining for at least one point of said transformed model a corresponding point in said electronic image; and adapting the matching model according to the at least one determined corresponding point.

19 Claims, 7 Drawing Sheets

(51) Int. Cl.
*G06T 7/246* (2017.01)
*G06K 9/48* (2006.01)
*G06T 3/00* (2006.01)
*G06K 9/46* (2006.01)

(52) U.S. Cl.
CPC ......... *G06K 9/6206* (2013.01); *G06K 9/6215* (2013.01); *G06K 9/6255* (2013.01); *G06T 3/0006* (2013.01); *G06T 7/248* (2017.01); *G06K 9/4604* (2013.01); *G06K 9/4652* (2013.01); *G06T 2207/10016* (2013.01); *G06T 2207/10024* (2013.01)

(58) Field of Classification Search
CPC ...... G06K 9/4604; G06K 9/6215; G06T 7/74; G06T 2207/10016; G06T 3/0006; G06T 2207/10024; G06T 7/248
See application file for complete search history.

(56) References Cited

U.S. PATENT DOCUMENTS

| | | | |
|---|---|---|---|
| 7,190,834 B2 | 3/2007 | Davis | |
| 9,646,201 B1* | 5/2017 | Horowitz | ........... G06K 9/00389 |
| 2017/0132451 A1* | 5/2017 | Namiki | .............. G06K 9/00208 |

FOREIGN PATENT DOCUMENTS

| | | |
|---|---|---|
| EP | 2048599 A1 | 4/2009 |
| EP | 2081133 A1 | 7/2009 |
| JP | 2010097341 A | 4/2010 |
| JP | 2012069003 A | 4/2012 |
| JP | 2015133049 A | 7/2015 |

OTHER PUBLICATIONS

G. Borgefors: Hierarchical chamfer matching: A parametric edge matching algorithm. IEEE Transactions on Pattern Analysis and Machine Intelligence, 10(6): 849-865, Nov. 1988.
Brown, Lisa Gottesfeld. "A survey of image registration techniques." ACM computing surveys (CSUR) 24(4): 325-376 (1992).
Cootes, Timothy F., et al. "Active shape models—their training and application." Computer vision and image understanding 61.1 (1995): 38-59.
O.-K. Kwon, D.-G. Sim, R.-H. Park: Robust Hausdorff distance matching algorithms using pyramidal structures. Pattern Recognition, 34: 2005-2013, 2001.
Y. Lamdan, J.T. Schwartz, H.J. Wolfson: Affine invariant model-based object recognition. IEEE Transactions on Robotics and Automation, 6(5): 578-589, Oct. 1990.
O. F. Olson, D. P. Huttenlocher: Automatic target recognition by matching oriented edge pixels. IEEE Transactions on Image Processing, 6(1): 103-113, Jan. 1997.
W. J. Rucklidge: Efficiently locating objects using the Hausdorff distance. International Journal of Computer Vision, 24(3): 251-270, 1997.
Tanimoto, Steven L. "Template matching in pyramids" Computer Graphics and Image Processing 16.4 (1981): 356-369.
M. Ulrich, C. Steger, and A. Baumgartner: Real-time object recognition using a modified generalized Hough transform, Pattern Recognition, 36(11): 2557-2570, 2003.
Aoi et al., "3D Modeling from a Sketch Image Using Generalized Cylinders." The Journal of the Institute of Image Information and Television Engineers, Japan, vol. 51, No. 8, p. 1319-1325, Aug. 20, 1997, English Abstract only, 8 pages.
Clippingdale et al., "Performance Improvement and Database Registration in the FAVRET Face Detection, Tracking and Recognition System." IEICE Technical Report, Japan, vol. 100, No. 701, p. 111-118, Mar. 8, 2001, English Abstract only, 9 pages.
Sugamoto et al., "Hierarchical Pattern Matching Method using Multiscale Representation." The Journal of the Institute of Electronics, Information and Communication Engineers, Japan, vol. 175-D-11, p. 1187-1194, Jul. 25, 1992, English Abstract only, 6 pages.
E-Space abstract of JP 2010097341.
E-Space of abstract JP 2012069003.
E-Space abstract of JP 2015133049.
English Translation of Japanese Office Action for Japanese Application No. 2017-158618, dated Nov. 6, 2018, 9 pages.

* cited by examiner

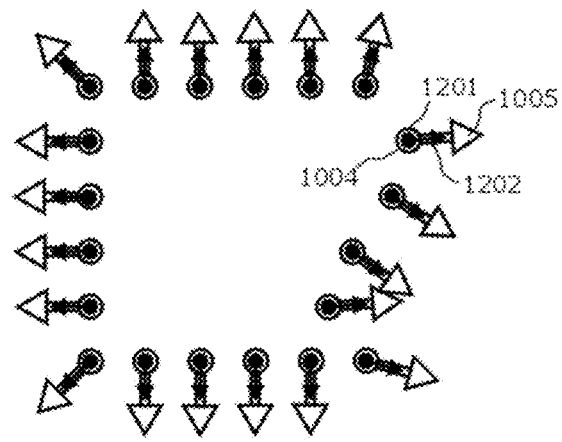
Figure 12
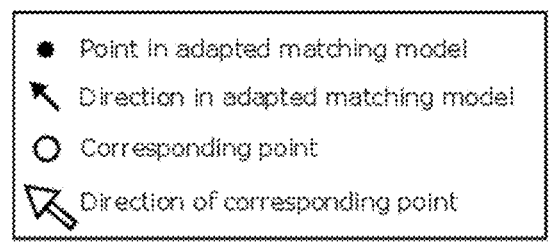
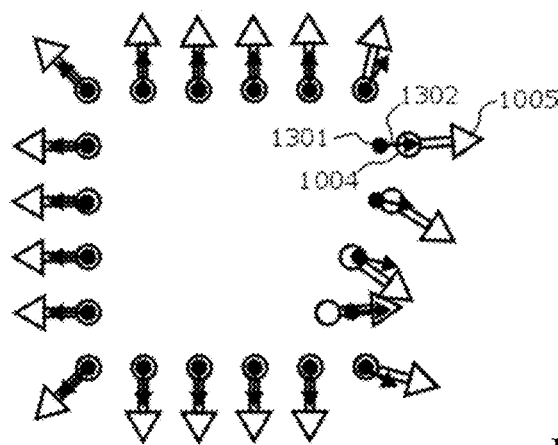
Figure 13
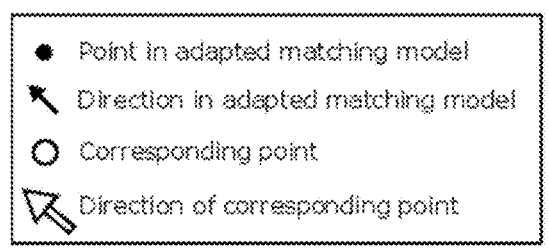

SYSTEM AND METHOD FOR MODEL ADAPTATION

This application claims benefit from European Application No. 17172079.0, which was filed on May 19, 2017, the entirety of said patent application is incorporated herein by reference.

FIELD OF THE INVENTION

This invention relates generally to machine vision systems, and more particularly, to visual recognition of objects in images and to visual tracking of objects in image sequences.

BACKGROUND OF THE INVENTION

The fast, robust, and accurate localization of a given 2D object template in images is the natural prerequisite for numerous computer vision and particularly machine vision applications. For example, for pick and place applications, an object recognition method must determine the location of the object that is imaged. Given its location in conjunction with the known geometry of the imaging device, a pose of the object can be calculated by methods that are well known in the art. Given this pose, a robot can grasp the object from, e.g., a conveyor belt. In the visual tracking of objects, an object recognition method must determine the location of an object in a sequence of images. For example, in image-based visual servo control, the object location can be used to control the robot motion. In traffic monitoring, an object recognition method must detect traffic participants such as cars or pedestrians in a video stream or image sequences.

Several methods have been proposed in the art to determine the position of an object in an image. Most of the methods compare a similarity between a set of possible matching model poses and the image. Positions that exceed a threshold and are local maxima with respect to this similarity measure are chosen as the location of the object.

Depending on the similarity measure that is used, a certain invariance against adverse imaging conditions is achieved. For instance, with normalized correlation as the similarity measure, invariance against linear gray value changes between the model image and the search image is achieved.

Many methods in the art represent the 2D object template by a matching model that consists of a plurality of model points, e.g. approaches that are based on Chamfer-Matching (Borgefors, 1988), approaches that are based on the Hausdorff Distance (Rucklidge, 1997, Kwon et al. 2001), or approaches that are based on geometric hashing (Lamdan and Schwartz, 1990). The model points may either be a sparse set of feature points such as edges or corner points, or a dense set of points that cover the 2D object template. The similarity between a possible matching model pose and the image is determined through the similarity of a subset of the matching model points and the image. Other methods use model points and directions for matching a model to an image. Directions can be represented, for example, by direction vectors or angles. Common examples of object recognition methods in the art that use directions are approaches that are based on the generalized Hough transform (Ballard, 1981, Ulrich et al. 2003) or approaches that are based modifications of the Hausdorff-Distance (Olson and Huttenlocher, 1997). Furthermore, there are approaches that use the dot product of the normalized directions of image and model feature as similarity measure, which is invariant against partial occlusion, clutter, and nonlinear contrast changes (EP 1193642, EP 2081133, EP 1394727, EP 2048599). Other approaches use angles for matching, where the model points may further include other attributes, such as an individual per-point weight (e.g. U.S. Pat. Nos. 6,850,646, 7,190,834, 7,016,539).

Typically, an exhaustive search over all pose parameters is computationally very expensive and prohibitive for most real-time applications. Most of the prior art methods overcome this speed limitation by building an image pyramid from both the model and the search image (see e.g., Tanimoto (1981) or Brown (1992)). Then, the similarity measure is evaluated for the full search range only at the highest pyramid level. At lower levels, only promising match candidates are tracked until the lowest pyramid level is reached.

A further way to speed up the search is to restrict the possible transformations the model may undergo in the search image. An affine transformation that maps input points $(x, y)^T$ to output points $(x', y')^T$ can be described in the geometrically meaningful parameterization $$\begin{pmatrix} x' \\ y' \end{pmatrix} = \begin{pmatrix} \cos\varphi & -\sin\varphi \\ \sin\varphi & \cos\varphi \end{pmatrix} \begin{pmatrix} 1 & -\sin\theta \\ 0 & \cos\theta \end{pmatrix} \begin{pmatrix} S_x & 0 \\ 0 & S_y \end{pmatrix} \begin{pmatrix} x \\ y \end{pmatrix} + \begin{pmatrix} t_x \\ t_y \end{pmatrix}.$$

The parameters describe a scaling of the original x and y axes by the different scaling factors $s_x$ and $s_y$, a skew transformation of the y axis with respect to the x axis, i.e., a rotation of the y axis by an angle $\theta$, while the x axis is kept fixed, a rotation of both axes by an angle $\varphi$, and finally a translation by a vector $(t_x, t_y)^T$. Typically, an object recognition system evaluates these parameters only for a reduced subset, e.g., only translation and rotation. Furthermore, the parameters are restricted to a certain fixed range, e.g., a reduced rotation range. This reduces the space of possible poses that an object recognition system must check on the highest pyramid level and hence speeds up the search. In some situations, the object that must be found is transformed according to a more general transformation than an affine transformation or a subset thereof. Two such transformations are a perspective transformation or a non-linear deformation.

The state-of-the-art methods for object recognition assume a constant model for object localization. Although some approaches allow a certain variation of the model points (see, e.g., Cootes (1995)), the model is not adapted after the object localization in the search image. This has several shortcomings when localizing an object that may change its appearance. Two common computer vision and machine vision applications are visual tracking, where an object is to be localized throughout a sequence of images, and the localization of deformable objects. An adaptation of the model after the object is successfully localized improves the localization quality in future images.

In visual tracking scenarios, most objects are 3D and their movement and rotation throughout the 3D world is generally not an affine transformation, which most of the 2d object recognition approaches assume. It is an open question how to adapt a point-based matching model to a localized object to a more general transformation than an affine transformation or a subset thereof.

The aim of the presented invention is to provide a general approach to adapt a point-based matching model to ensure a robust recognition even if the object changes its appearance.

SUMMARY OF THE INVENTION

The invention is specified in the claims. It is directed to methods and apparatuses for adapting a matching model that can be used to determine the pose of an object in an image, where the adaptation is based on the appearance of the object in an image. The invention may also relate to a system or apparatus performing and/or implementing the described methods.

The present invention provides a system and method for finding objects in electronic images using matching models of the objects and for adapting the matching models based on the difference between the original matching model and the detection result in the image. Such a method can, for example, be used to track an object over multiple frames of a video sequence where the appearance of the object can change over time. Such changes in appearance can have multiple reasons, such as deformations of the object, lighting changes, viewpoint changes and others. Due to those changes, while the original matching model might be a good representation of the object in the first frame, it might not be for later frames. Since the change of the object's appearance is not always known beforehand, the user of the method might not be able to provide a matching model that represents the appearance of the target over all frames. Instead, only the appearance in the first frame might be given. The present invention provides a way of dynamically adjusting the matching model based on the observations in the previous frames. This allows the method to find the object in later frames, even if its appearance has changed.

The method preferably comprises four main phases: the matching phase, the transformation phase, the correspondence search phase, and the adaptation phase.

In the matching phase, given the matching model of an object that consists of a plurality of points and an electronic image that contains the object, the pose of the object in the electronic image is determined using the matching model. In the transformation phase, the matching model is transformed using the determined pose, yielding a transformed model. In the correspondence search phase, for at least one point of said transformed model, a corresponding point in the electronic image is determined. In the adaptation phase, the matching model is adapted according to at least one determined corresponding points.

According to a first aspect, the invention provides a method as defined in claim 1.

Preferably, in the adaptation phase, the position of a plurality of points of the matching model is adapted.

Preferably, in the matching phase, a plurality of points of the matching model is used to determine the pose of the object.

In a further preferred embodiment, the features of which may optionally be combined with the features of the above-mentioned first aspect, the matching model consists of a plurality of points and directions and the adaptation of the matching model in the adaptation phase comprises adapting the position of a plurality of points and directions of the matching model. In a preferred embodiment, said directions are represented by direction vectors. In a further preferred embodiment, the directions are represented by angles. In alternative embodiments, the directions can be represented by bitmaps of discretized direction or angle ranges, or by other means.

In a further preferred embodiment, the features of which may optionally be combined with the features of the above-mentioned first aspect and the above-mentioned preferred embodiment, in the matching phase, a plurality of points and directions of the matching model is used to determine the pose of the object, regardless of the representation of the directions.

When representing the directions by direction vectors, it is further preferred that in the matching phase, a plurality of points and direction vectors of the matching model are used and the dot product of said direction vectors are computed to determine the pose of the object.

When adapting the position of a plurality of points of the matching model in the adaptation phase, it is preferred to set the position of a plurality of model points of the matching model to the position of the corresponding points. In an alternative embodiment, the position of a plurality of model points of the matching model can be set to a position that is a function of the position of the point of the matching model and of the corresponding point.

When the matching model consists of a plurality of points and directions and the adaptation of the matching model in the adaptation phase comprises adapting the position of a plurality of points and directions of the matching model, it is further preferred that when adapting the position of a plurality of points and directions of the matching model, the position and direction of a plurality of model points of the matching model are set to the position and direction of the corresponding points. In an alternative embodiment, the position and direction of a plurality of model points of the matching model are set to a position and a direction that are functions of the position and direction of the points of the matching model and of the position and direction of the corresponding points.

In another preferred embodiment, the features of which may optionally be combined with the features of the above-mentioned first aspect and the above-mentioned preferred embodiments, the matching phase, the transformation phase, the correspondence search phase, and the adaptation phase are performed in an iterative manner with at least two iterations and with the resulting adapted matching model from the adaptation phase acting as the matching model of the next iteration.

In another preferred embodiment, the features of which may optionally be combined with the features of the above-mentioned first aspect and the above-mentioned preferred embodiments, the matching model of the object consists of a plurality of model levels and a model level consisting of a plurality of points; in the matching phase, an image pyramid of the electronic image is created, the image pyramid consisting of a plurality of image levels; the pose of the object on a pyramid level is determined with a lower resolution by using the model level that corresponds to the pyramid level; the pose of the object on a pyramid level is refined with a higher resolution by using the model level that corresponds to the pyramid level; and the transformation phase, the correspondence search phase and the adaptation phase are performed for each pyramid and model level, yielding an adapted matching model on each level.

In another preferred embodiment, the features of which may optionally be combined with the features of the above-mentioned first aspect and the above-mentioned preferred embodiments, the matching model of the object consists of a plurality of model levels and a model level consisting of a plurality of points; in the matching phase, an image pyramid of the electronic image is created, the image pyramid consisting of a plurality of image levels; the pose of the object on a pyramid level is determined with a lower resolution by using the model level that corresponds to the pyramid level; the pose of the object on a pyramid level is refined with a higher resolution by using the model level that corresponds to the pyramid level; and the transformation phase, the correspondence search phase and the adaptation phase are performed on a pyramid level with a higher resolution yielding adaptations on the model level with said higher resolution and wherein the following additional step is performed: propagating the adaptations on the model level with said higher resolution to the model levels with lower resolutions, yielding an adapted matching model on each level.

In another preferred embodiment, the features of which may optionally be combined with the features of the above-mentioned first aspect and the above-mentioned preferred embodiments, based on either of the embodiments described above, the correspondence search phase comprises searching for a corresponding point in the electronic image within a neighborhood of the at least one point of the transformed model.

In another preferred embodiment, the features of which may optionally be combined with the features of the above-mentioned first aspect and the above-mentioned preferred embodiments, based on either of the embodiments described above, the correspondence search phase comprises searching for a corresponding point in the electronic image within a neighborhood of the at least one point of the transformed model wherein the neighborhood is determined by the direction of said point.

In another preferred embodiment, the features of which may optionally be combined with the features of the above-mentioned first aspect and the above-mentioned preferred embodiments, the adaptation phase comprises adapting the matching model according to a subset of the determined corresponding points.

In another preferred embodiment, the features of which may optionally be combined with the features of the above-mentioned first aspect and the above-mentioned preferred embodiments, the matching phase, the transformation phase, the correspondence search phase, and the adaptation phase are performed in an iterative manner with at least two iterations and where in the adaptation phase, the matching model is adapted according to at least one determined corresponding point in the at least one previous or current iteration, and with the resulting adapted matching model from the adaptation phase acting as the input matching model in the next iteration.

BRIEF DESCRIPTION OF THE DRAWINGS

The invention will be more fully understood from the following detailed description, in conjunction with the accompanying figures, wherein:

FIG. 12 shows the adapted matching model after setting the position and direction of the model points to the position and direction of the corresponding points;
FIG. 13 shows the adapted matching model after setting the position and direction of the model points to a position and a direction that are a functions of the position and direction of the points of the matching model and of the position and direction of the corresponding points (here, the functions describe linear interpolations);

DETAILED DESCRIPTION OF THE PREFERRED EMBODIMENTS

All of the following data is supposed to be available in electronic form, preferably digital. The methods and algorithms described are considered to be in electronic form and computer implemented.

The present invention is directed to methods and apparatuses for adapting a matching model that can be used to determine the pose of an object in an image, where the adaptation is based on the appearance of the object in an image.

The invention assumes that a matching model (see FIG. 1) is provided. The matching model must allow the determination of the pose of the object in an electronic image by using one of several available matching approaches. The pose can, for example, be the position (e.g., row and column coordinates) of the object in the image. If the object might appear in different orientations, then the pose includes the orientation (e.g., an angle) of the object in the image. Furthermore, if the scale of the object in the image is unknown, the pose includes the object scale (e.g., a scale factor). Sometimes, the pose includes two different scaling factors if the aspect ratio of the object is allowed to change. Finally, in some applications, the pose might contain the parameters of a general affine transformation or even the parameters of a projective transformation in the most general case.

Figure 1:
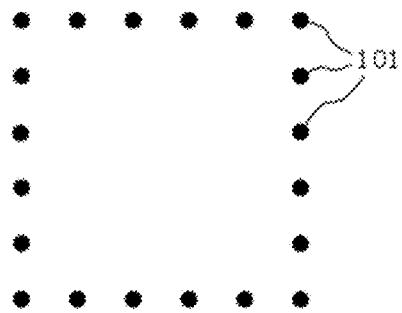
FIG. 1 shows the points of a matching model.

In a preferred embodiment of the invention, the matching model consists of a plurality of model points (101). The model points can, for example, describe the object's boundary or gray value edges or color edges of the texture or of the structure on the object. The edges are typically computed from a model image of the object, in which gray value or color edges are extracted. For this, different edge extraction methods can be used (see (Steger et al., 2007, Chapter 3.7), for example). In other applications, the model points are extracted from a CAD model of the object. In FIG. 1, the model points of a square object are illustrated.

Figure 2:
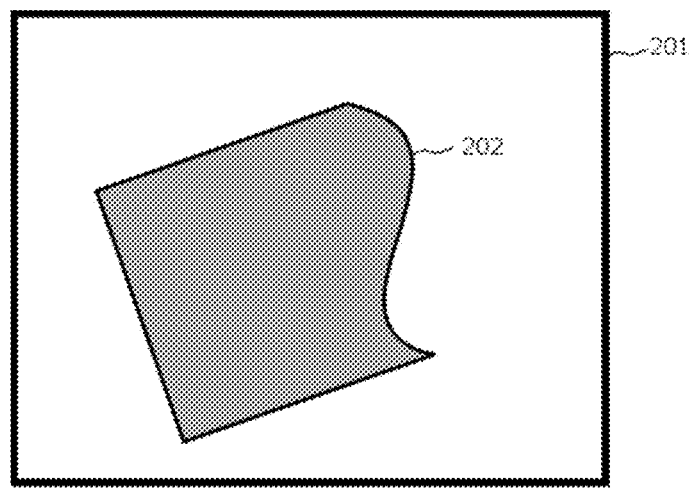
FIG. 2 shows an electronic image of an object.

Furthermore, the invention assumes that an electronic image (201) of the object is provided. In a preferred embodiment of the invention, the image is acquired with a camera. FIG. 2 shows an image where the object appears in a different orientation compared to the matching model. Hence, in this specific illustrated example, the pose contains the position (row, column) and the orientation (angle) of the object in the image. Also note that the shape of the object has slightly changed in the image compared to the matching model. In a first step of the invention, the pose of the object (202) is determined in the image. In a preferred embodiment of the invention, for this purpose a matching approach is applied that uses the model points for matching. There are several matching approaches available that are able to determine the pose of an object in an image based on a matching model that consists of points (Steger et al., 2007, Chapter 3.11.5). Some selected examples are the Chamfer matching (Borgefors, 1988), the Hausdorff distance ((Rucklidge, 1997) or (Kwon et al., 2001)), and Geometric Hashing (Lamdan, 1990). If the matching was successful, the matching approach returns the pose of the object in the image.

Figure 3:
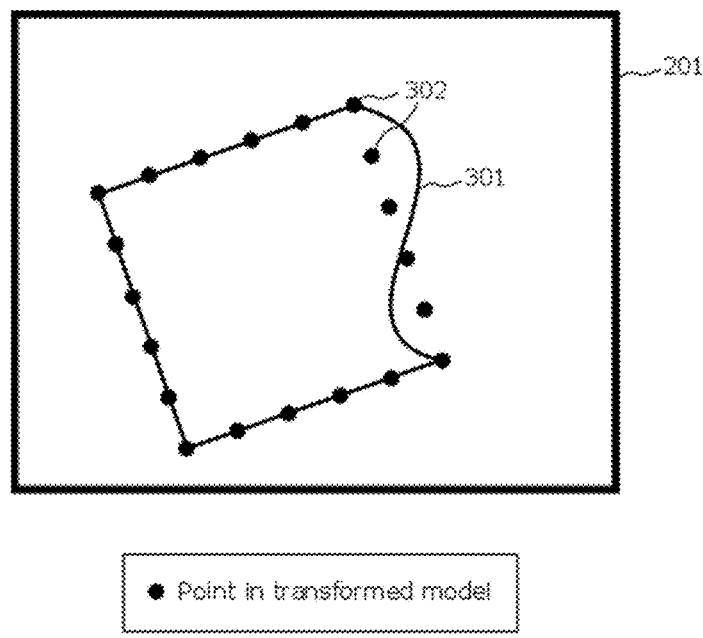
FIG. 3 shows the points of a transformed model.

In the next step of the invention, the matching model is transformed according to the pose that was returned by the matching approach (see FIG. 3). In the illustrated example application, the model points (101) are transformed by applying a translation and a rotation to the model points according to said pose, yielding points (302) of the transformed model. For illustration purposes, in FIG. 3 and in the following figures, only the boundary edges of the object in the image are visualized (301). In other applications of the invention, the model points are transformed, for example, by applying a scaling, an affine transformation, or a projective transformation, depending on which transformation the object is allowed to undergo in the image.

Figure 4:
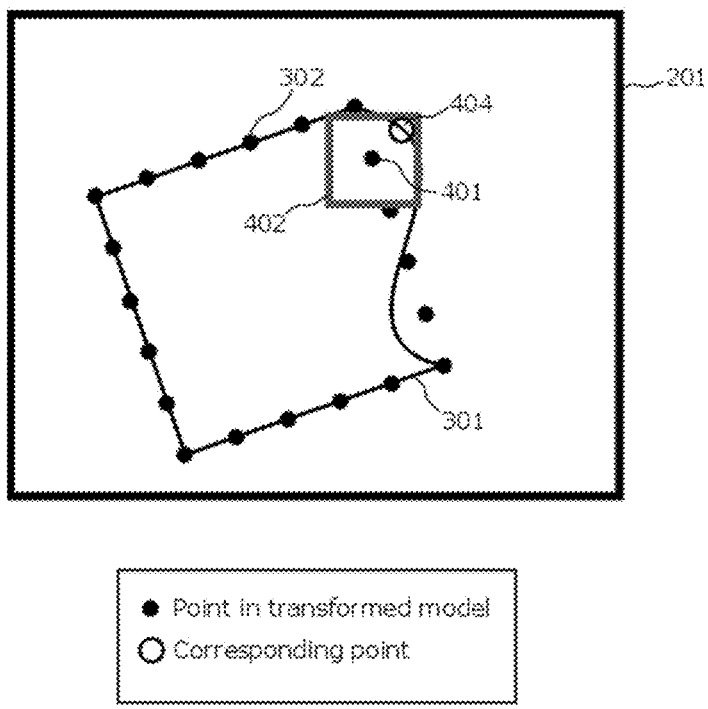
FIG. 4 illustrates the determination of a corresponding point in the electronic image within a neighborhood of a point of the transformed model.

In the next step of the invention, for a point (302) of the transformed model, a corresponding point (404) in the image (201) is determined. A preferred embodiment of the invention is illustrated in FIG. 4: For an exemplarily selected point (401) of the transformed model, a corresponding point (404) in the image is searched within a neighborhood of the point (401) of the transformed model. In one preferred embodiment, the neighborhood is described by a square region (402) centered at the point (401). In an alternative embodiment, the neighborhood is described by a circular region centered at the point. Other shapes and positions of the neighborhood region are possible without departing from the scope of this invention. In a preferred embodiment of the invention, the search for the corresponding point within the neighborhood region is performed by computing the edge amplitude in the image within the neighborhood region and selecting the point in the search image with the highest edge amplitude within the neighborhood region. In an alternative embodiment a non-maximum suppression is performed to suppress points in the search image that do not have a local maximum of the edge amplitude. In an alternative embodiment, the point in the neighborhood region is selected that is closest to the point of the transformed model and that has an edge amplitude that exceeds a certain threshold. In another alternative embodiment, the point in the neighborhood region is selected that shows the highest similarity with the point of the transformed model, where the similarity can be measured, for example, by using one of different well-known similarity measures that are based on geometric features if no gray value or color information is available in the model, or on gray value or color features if the model points contain additional gray value or color information. Furthermore, different similarity measures and criteria can be combined to determine the corresponding point.

Figure 5:
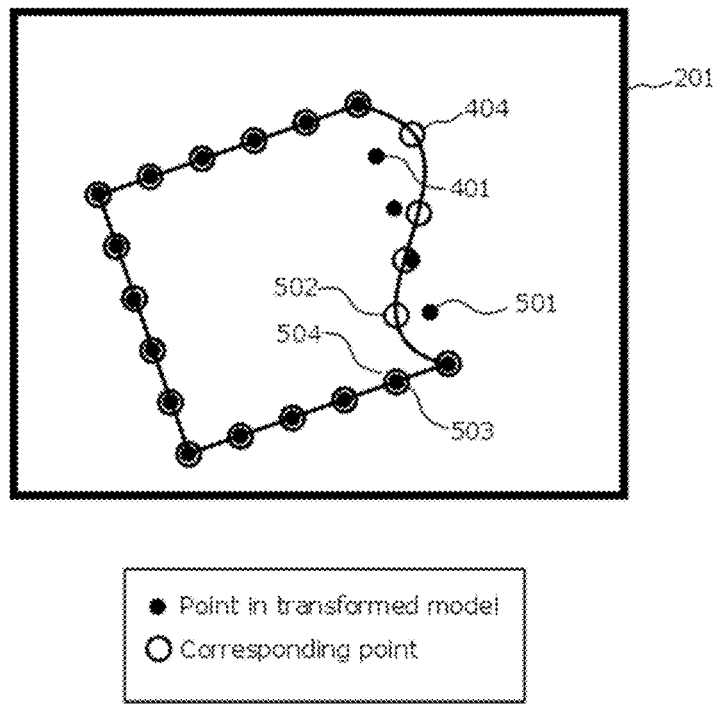
FIG. 5 shows corresponding points in the electronic image for all points in the transformed model.

In a preferred embodiment, for all points in the transformed model, a corresponding point in the image is searched. In an alternative embodiment, the search is restricted to a subset of points in the transformed model. As a result of this step, a plurality of corresponding points is available. For some points of the transformed model, no corresponding point might be available because the search was restricted to a subset of points in the transformed model or because no corresponding point could be found in the neighborhood region, e.g., because no point with an edge amplitude that exceeds a certain threshold was found or because no point with a similarity that exceeds a certain threshold was found. In the illustrated example application of FIG. 5, for each point (e.g., (401), (501), and (503)) of the transformed model a found corresponding point (e.g., (404), (502), and (504), respectively) in the image is displayed.

Figure 6:
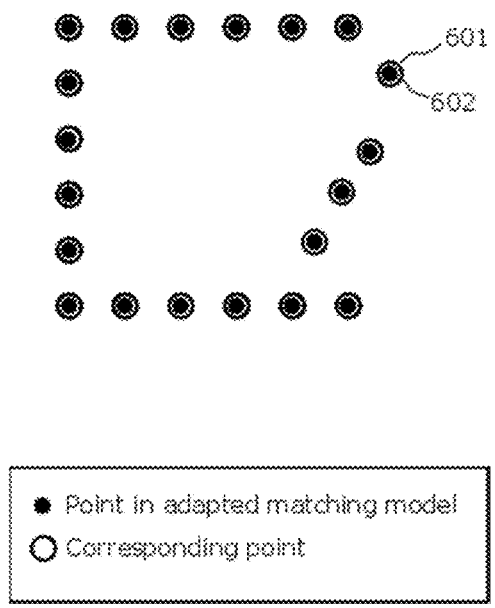
FIG. 6 shows the adapted matching model after setting the position of the model points of the matching model to the position of the corresponding points.
Figure 7:
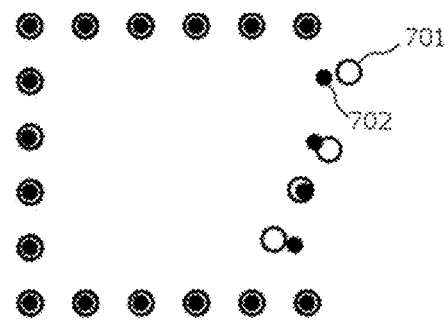
FIG. 7 shows the adapted matching model after setting the position of the model points of the matching model to a position that is a function of the position of the points of the matching model and of the position of the corresponding points (here, the function describes a linear interpolation)

In the final step of the invention, the matching model is adapted according to the determined corresponding points. For this, the corresponding points are transformed back to the coordinate system of the matching model by applying the inverse transformation of the transformation that was applied to the matching model to obtain the transformed model. The back-transformed corresponding points are visualized in FIGS. 6 and 7 (e.g., (601), (701)). To adapt the matching model, in a preferred embodiment of the invention, the points in the model are set to the position of their (back-transformed) corresponding points. The resulting points in the adapted matching model are visualized in FIG. 6 (e.g., (602)). In another preferred embodiment of the invention, the points in the model are set to a position that is a function of the position of one or more points of the matching model and of the position of one or more (back-transformed) corresponding points. The resulting points in the adapted matching model are visualized in FIG. 7 (e.g., (702)). In a preferred embodiment, said function linearly interpolates the position of a model point and the position of the (back-transformed) corresponding point. With an interpolation factor, which is a floating value between 0 and 1, the degree of the model adaptation can be controlled. For an interpolation factor of 0, no model adaptation is performed. For an interpolation factor of 1, the points in the model are set to the position of their (back-transformed) corresponding points. For an interpolation factor of 0.5, for example, the points in the model are set to the center of the position of the original model point and the position of the (back-transformed) corresponding point. Other interpolation functions can be alternatively applied without departing from the scope of this invention.

In an alternative embodiment of the invention, only a subset of points of the matching model and a subset of corresponding points are used to compute the position of the points in the adapted matching model. For example, the subset of points of the matching model and the subset of the corresponding points can be used to calculate the parameters of a warping function, where the input of the warping function is the position of a point of the matching model and the output is the position of that point in the adapted matching model. The warping function can be used to compute the position of all or of a subset of points in the adapted matching model.

In another preferred embodiment of the invention, the matching model consists of a plurality of model points (801) and directions (802). The directions can be represented by direction vectors, normalized direction vectors, or angles, for example. The directions are typically computed from a model image of the object, in which gray value or color edges are extracted. The direction is then obtained from the edge or gradient direction of the extracted edges. For this, different edge extraction methods can be used that allow to directly compute the edge or gradient direction (see (Steger et al., 2007, Chapter 3.7), for example). Alternatively, edge extraction methods can be used that do not allow such a computation. In this case, the edge or gradient direction can be calculated in a post-processing step by linking neighboring edge points. The linked edge points define the edge direction. In other applications, the model points are extracted from a CAD model of the object. In this case, the direction can be computed from the CAD model, as well.

Figure 8:
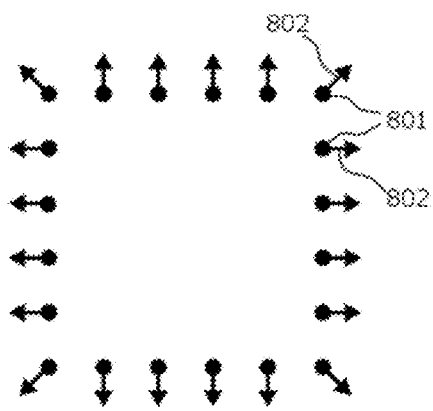
FIG. 8 shows the points and directions of a matching model.
Figure 8:
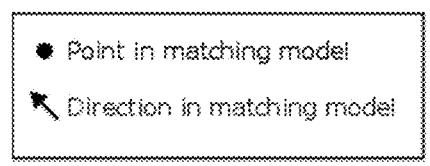

For this, the direction is obtained from the direction of the contours that are stored in the CAD model. In the example application that is illustrated in FIG. 8, the directions are represented by normalized gradient vectors (802).

In another preferred embodiment of the invention, the matching approach that is used to determine the pose of the object (301) in the image (201) uses the model points and the directions for matching. There are several matching approaches available that are able to determine the pose of an object in an image based on a matching model that consists of points and directions (Steger et al., 2007, Chapter 3.11.5). Some selected examples are the generalized Hough transform (Ballard, 1981; Ulrich, 2003), a modification of the Hausdorff distance that allows to take directions into account (Olson and Huttenlocher, 1997), approaches that are based on the dot product of the direction vectors (EP 1193642, EP 1394727, EP 2081133, EP 2048599) and approaches that use angles for matching as described in U.S. Pat. Nos. 6,850,646, 7,190,834, and 7,016,539. If the matching was successful, the matching approach returns the pose of the object in the image.

Figure 9:
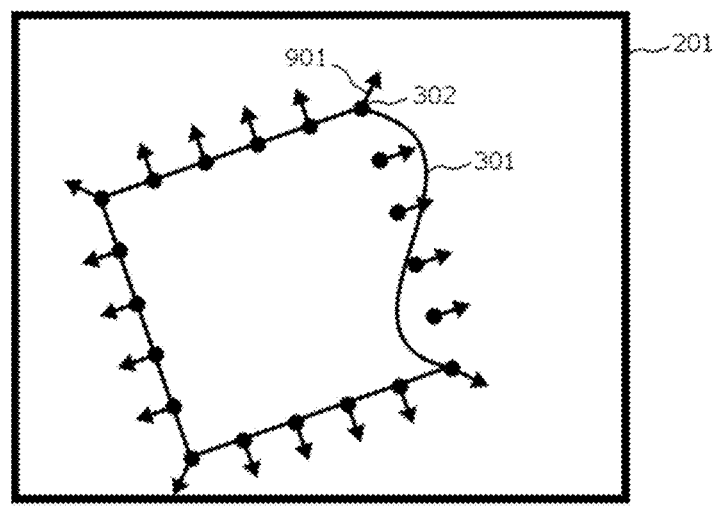
FIG. 9 shows the points and directions of a transformed model.
Figure 9:
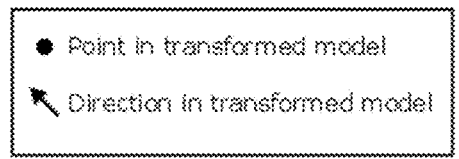

In the next step of the invention, the matching model, which contains points and directions, is transformed according to the pose that was returned by the matching approach (see FIG. 9). In the illustrated example application, the points (801) and the directions (802) of the matching model are transformed by applying a translation and a rotation to said points and directions according to said pose, yielding points (302) and directions (901) of the transformed model. In other applications of the invention, the points and the directions are transformed by applying a scaling, an affine transformation, or a projective transformation, for example, depending on which transformation the object is allowed to perform in the image.

In the next step of the invention, for a point (1001) of the transformed model, which contains points and directions, a corresponding point in the image (201) is determined. In one embodiment of the invention, the determination of the corresponding point is performed as described above and as illustrated in FIG. 4: For an exemplarily selected point (401) of the transformed model, a corresponding point in the image is searched within a neighborhood of the point (401) of the transformed model. In one preferred embodiment, the neighborhood is described by a square region (404) centered at the point. In an alternative embodiment, the neighborhood is described by a circular region centered at the point. Other shapes and positions of the neighborhood region are possible without departing from the scope of this invention. In a preferred embodiment of the invention, the search for the corresponding point within the neighborhood region is performed by computing the edge amplitude in the image within the neighborhood region and selecting the point in the search image with the highest edge amplitude within the neighborhood region. In an alternative embodiment a non-maximum suppression is performed to suppress points in the search image that do not have a local maximum of the edge amplitude. In an alternative embodiment, the point in the neighborhood region is selected that is closest to the point of the transformed model and that has an edge amplitude that exceeds a certain threshold. In another alternative embodiment, the point in the neighborhood region is selected that shows the highest similarity with the point of the transformed model, where the similarity can be measured by using one of different well-known similarity measures that are based on geometric features if no gray value or color information is available in the model, or on gray value or color features if the model points contain additional gray value or color information. If the matching model contains directions, the directions can be used to compute the similarity by using one of the approaches described in EP 1193642, EP 1394727, EP 2081133, EP 2048599, for example. For this, the directions are computed in the neighborhood region in the search image. Furthermore, different similarity measures and criteria can be combined to determine the corresponding point.

Figure 10:
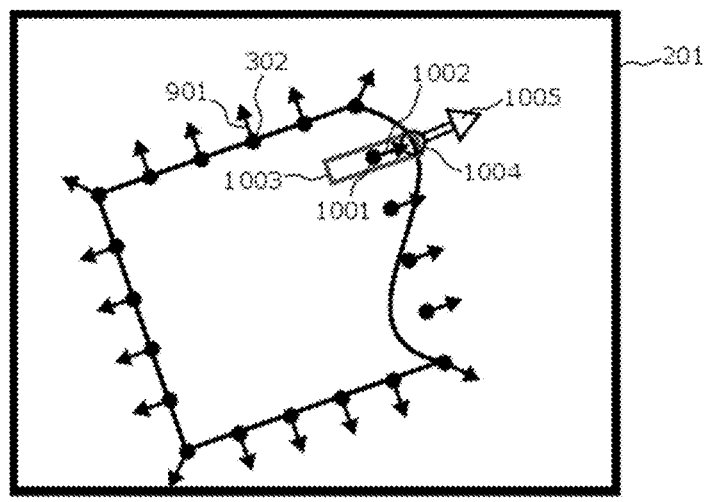
FIG. 10 illustrates the determination of a corresponding point in the electronic image within a neighborhood of a point of the transformed model wherein the neighborhood is determined by the direction of said point.

In an alternative embodiment, which is illustrated in FIG. 10, the position of the points (1001) and the directions (1002) in the transformed model are used to compute the neighborhood region (1003). In one preferred embodiment, the neighborhood is described by a rectangular region (1003) that is centered at the point (1001) in the transformed model and that has an orientation that is determined by the direction (1002) in the transformed model. In an alternative embodiment, the neighborhood is described by an elliptical-shaped region centered at the point (1001) and that has an orientation that is determined by the direction (1002) in the transformed model. Other shapes and positions of the neighborhood region are possible without departing from the scope of this invention.

The search for the corresponding point (1004) within the neighborhood region (1003) is performed by using one of the methods described above. As a result, for a point (1001) in the transformed model, the corresponding point (1004) is obtained. If the matching model contains points and directions, for a point (1001) and its direction (1002), the corresponding point (1004) and its direction (1005) is obtained.

Figure 11:
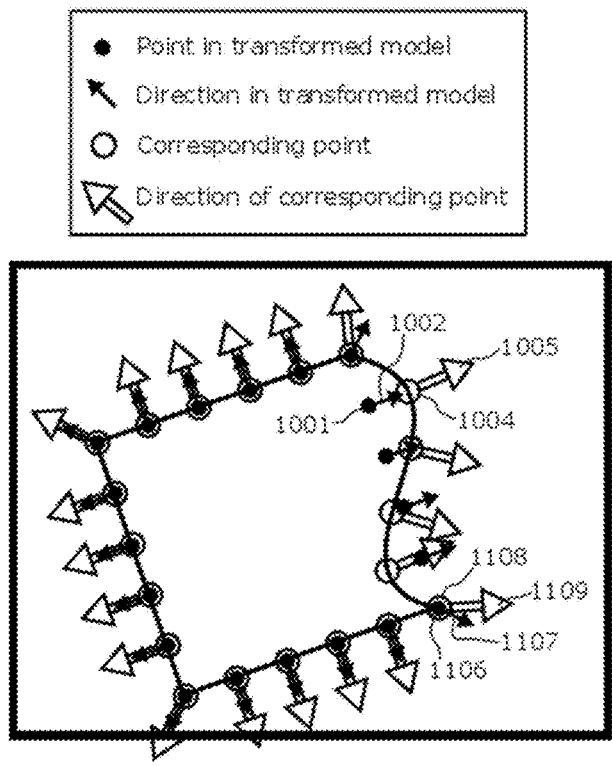
FIG. 11 shows corresponding points and directions in the electronic image for all points in the transformed model.

In another preferred embodiment, for all points and directions in the transformed model, a corresponding point and direction in the image is searched. In an alternative embodiment, the search is restricted to a subset of points in the transformed model. As a result of this step, a plurality of corresponding points and directions is available. For some points of the transformed model, no corresponding point might be available because the search was restricted to a subset of points in the transformed model or because no corresponding point could be found in the neighborhood region, e.g., because no point with an edge amplitude that exceeds a certain threshold was found or because no point with a similarity that exceeds a certain threshold was found. If the model contains directions, the direction of the transformed model point and the direction of a potential corresponding point in the image can be compared, for example. If they differ too much, the potential corresponding point is rejected and not accepted as a corresponding point. In the illustrated example application of FIG. 11, for each point (e.g., (1001) and (1106)) and direction (e.g., (1002) and (1107)) of the transformed model, a found corresponding point (e.g., (1004) and (1108), respectively) and the corresponding direction (e.g., (1005) and (1109), respectively) in the image is displayed.

In the final step of the invention, the matching model, which contains points and directions, is adapted according to the determined corresponding points and directions. For this, the corresponding points and directions are transformed back to the coordinate system of the matching model by applying the inverse transformation of the transformation that was applied to the matching model to obtain the transformed model. The back-transformed corresponding points (e.g., (1004)) and directions (e.g., (1005)) are visualized in FIGS. 12 and 13. To adapt the matching model, in a preferred embodiment of the invention, the points of the matching model are set to the position of their (back-transformed) corresponding points and the directions of the matching model are set to the (back-transformed) directions of the corresponding points. The resulting points (e.g., (1201)) and directions (e.g., (1202)) in the adapted matching model are visualized in FIG. 12.

In another preferred embodiment of the invention, the points in the model are set to a position that is a function of the position of one or more points of the matching model and of the position of one or more (back-transformed) corresponding points. Furthermore, the directions in the model are set to a direction that is a function of the directions of one or more points of the matching model and of the directions of one or more (back-transformed) corresponding points. The resulting points (e.g. (1301)) and directions (e.g. (1302)) in the adapted matching model are visualized in FIG. 13. In a preferred embodiment, said functions linearly interpolate the position and direction of a model point and the position and direction of the (back-transformed) corresponding point. With an interpolation factor, which is a floating value between 0 and 1, the degree of the model adaptation can be controlled. For an interpolation factor of 0, no model adaptation is performed. For an interpolation factor of 1, the points and directions in the model are set to the position of their (back-transformed) corresponding points and directions. For an interpolation factor of 0.5, for example, the points in the model are set to the center of the position of the original model point and the position of the (back-transformed) corresponding point, while the directions in the model are set to the mean direction of the original model directions and the direction of the (back-transformed) corresponding point. Other interpolation functions can be alternatively applied without departing from the scope of this invention.

In an alternative embodiment of the invention, only a subset of points and directions of the matching model and a subset of corresponding points and directions are used to compute the position and direction of the points in the adapted matching model. For example, the subset of points and directions of the matching model and the subset of the corresponding points and directions can be used to calculate the parameters of two warping function, one for the position and one for the direction. The input of the first warping function is the position of a point of the matching model and the output is the position of that point in the adapted matching model. The input of the second warping function is the direction of a point of the matching model and the output is the direction of that point in the adapted matching model. Alternatively, a single function can be used where the input of the function is the position and direction of a point of the matching model and the output is the position and direction of that point in the adapted matching model. The warping functions can be used to compute the position and direction of all or of a subset of points in the adapted matching model.

In a preferred embodiment of the invention, the adapted matching model is used for determining the pose of the object in a subsequent image. The adapted matching model might also act as the input matching model in a second iteration of the model adaptation. Hence, in one embodiment, the matching model is adapted again based on the subsequent image and by using one of the methods described above. In an alternative embodiment, the matching model is not adapted in every image, in which the pose of the object is determined, but only in every second or third image and so forth. In another alternative embodiment, the model is adapted after a certain period of time has passed. In another alternative embodiment, the matching model is adapted if a certain criterion is fulfilled, e.g., if the matching approach returns a quality measure for the match and the quality measure falls below a certain threshold.

In another alternative embodiment of the invention, the matching approach uses a multi-resolution method for speeding up the search for the object in the image. One well-known realization of a multi-resolution method is to create an image pyramid of the input image, the image pyramid consisting of a plurality of image levels with decreasing image resolutions on higher levels. In this case, the matching model consists of a plurality of model levels and each model level consists of a plurality of point or of a plurality of points and directions. Higher model levels represent the object in a lower resolution. Determining the pose of the object is typically performed by performing the matching on a higher pyramid level by using the model level that corresponds to the resolution of the image level, yielding poses of matching candidates. The poses of the matching candidates are then refined on lower pyramid levels (of higher resolution) by using the model level that corresponds to the resolution of the lower image level. In one embodiment of the invention, the model adaptation is performed on each pyramid level, and hence for each model level, separately. Therefore, the methods for adapting a model, which are described above, are applied to each model level. In an alternative embodiment of the invention, the model adaptation, as it is described above, is only performed on the lowest pyramid level (of highest resolution). As the result, only the model level with highest resolution is adapted. Therefore, the adaptation of the model level with highest resolution is propagated to model levels with lower resolutions in a subsequent step. For the propagation of model adaptation to different resolution levels, interpolation functions can be used, as described in EP 2081133, for example.

In some applications, it is desirable to apply a model adaptation only if it is consistent over a plurality of subsequent images. This increases the robustness to noise and to outliers in the correspondences. Therefore, in an alternative embodiment of the invention, the adapted matching model acts as the input matching model in a plurality of subsequent iterations of the model adaptation. However, the matching model is adapted only if the potential adaptations are consistent over a plurality of images. For example, a model point is only shifted to the right if the corresponding point of the model point was found shifted to the right in at least two consecutive images.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. In other words, while several particular embodiments of the invention have been described in detail, various modifications to the preferred embodiments can be made without departing from the spirit and scope of the invention. Accordingly, the above description is not intended to limit the invention except as indicated in the following claims.

Furthermore, in the claims the word "comprising" does not exclude other elements or steps, and the indefinite article "a" or "an" does not exclude a plurality. A single unit may fulfill the functions of several features recited in the claims. Any reference signs in the claims should not be construed as limiting the scope.

REFERENCES CITED

Patent Documents Cited in the Description
EP 1193642: System and method for object recognition
EP 1394727: Hierarchical component-based object recognition
EP 2081133: System and method for deformable object recognition
EP 2048599: System and method for 3D object recognition
U.S. Pat. No. 6,850,646: Fast high-accuracy multi-dimensional pattern inspection
U.S. Pat. No. 7,190,834: Methods for finding and characterizing a deformed pattern in an image
U.S. Pat. No. 7,016,539: Method for fast, robust, multi-dimensional pattern recognition Non-Patent Literature Cited in the Description
D. H. Ballard: Generalizing the Hough transform to detect arbitrary shapes. *Pattern Recognition,* 13(2): 111-122, 1981.
G. Borgefors: Hierarchical chamfer matching: A parametric edge matching algorithm. *IEEE Transactions on Pattern Analysis and Machine Intelligence,* 10(6): 849-865, November, 1988.
Brown, Lisa Gottesfeld. "A survey of image registration techniques." *ACM computing surveys (CSUR)* 24(4): 325-376 (1992).
Cootes, Timothy F., et al. "Active shape models-their training and application." *Computer vision and image understanding* 61.1 (1995): 38-59.
O.-K. Kwon, D.-G. Sim, R.-H. Park: Robust Hausdorff distance matching algorithms using pyramidal structures. *Pattern Recognition,* 34: 2005-2013, 2001.
Y. Lamdan, J. T. Schwartz, H. J. Wolfson: Affine invariant model-based object recognition. *IEEE Transactions on Robotics and Automation,* 6(5): 578-589, October 1990.
O. F. Olson, D. P. Huttenlocher: Automatic target recognition by matching oriented edge pixels. *IEEE Transactions on Image Processing,* 6(1): 103-113, January 1997.
W. J. Rucklidge: Efficiently locating objects using the Hausdorff distance. *International Journal of Computer Vision,* 24(3): 251-270, 1997.
Tanimoto, Steven L. "Template matching in pyramids." *Computer Graphics and Image Processing* 16.4 (1981): 356-369.
M. Ulrich, C. Steger, and A. Baumgartner: Real-time object recognition using a modified generalized Hough transform, *Pattern Recognition,* 36(11): 2557-2570, 2003.
Carsten Steger, Markus Ulrich, Christian Wiedemann: Machine Vision Algorithms and Applications. Wiley-VCH, Weinheim, 2007.

The invention claimed is:

1. A method for adapting a matching model of an object comprising the following steps:
   (a) providing an electronic image of the object;
   (b) providing a matching model of the object, the matching model comprising a plurality of model levels comprising a plurality of points and optionally a plurality of directions;
   (c) determining a pose of the object in said electronic image by using a matching approach that uses said matching model, wherein step (c) includes:
      (c1) creating an image pyramid of said electronic image, the image pyramid consisting of a plurality of image levels,
      (c2) determining the pose of the object on a first image level of the image pyramid with a lower resolution by using a first model level that corresponds to the first image level,
      (c3) refining the pose of the object on a second image level of the image pyramid with a higher resolution by using a second model level that corresponds to the second image level;
   (d) transforming the matching model according to said pose, yielding a transformed model;
   (e) determining for at least one point of said transformed model a corresponding point in said electronic image; and
   (f) adapting the matching model according to the at least one determined corresponding point.

2. The method of claim 1, wherein adapting the matching model in step (f) comprises adapting the position of a plurality of points of the matching model.

3. The method of claim 2, wherein adapting the position of a plurality of points of the matching model comprises setting the position of a plurality of points of the matching model to the position of said corresponding points.

4. The method of claim 2, wherein adapting the position of a plurality of points of the matching model comprises setting the position of a plurality of points of the matching model to a position that is a function of the positions of said points of the matching model and of said corresponding points.

5. The method claim 1, wherein the matching approach in step (c) uses a plurality of points of the matching model to determine said pose of the object.

6. The method of claim 1, wherein the matching model consists of a plurality of points and directions and wherein adapting the matching model in step (f) comprises adapting the position of a plurality of points and directions of the matching model.

7. The method of claim 6, wherein the directions are represented by direction vectors.

8. The method of claim 7, wherein the matching approach in step (c) uses a plurality of points and direction vectors of the matching model and computes the dot product of said direction vectors and the corresponding directions in the image to determine said pose of the object.

9. The method of claim 6, wherein the directions are represented by angles.

10. The method of claim 6, wherein the matching approach in step (c) uses a plurality of points and directions of the matching model to determine said pose of the object.

11. The method of claim 6, wherein adapting the position of a plurality of points and directions of the matching model comprises setting the position and direction of a plurality of points of the matching model to the position and direction of said corresponding points.

12. The method of claim 6, wherein adapting the position of a plurality of points and directions of the matching model comprises setting the position and direction of a plurality of points of the matching model to a position and a direction that are functions of the position and direction of the points of the matching model and of the position and direction of said corresponding points.

13. The method of claim 6, wherein step (e) comprises searching for a corresponding point in said electronic image within a neighborhood of the at least one point of said transformed model, wherein the neighborhood is determined by the direction of said at least one point.

14. The method of claim 1, wherein steps (a)-(f) are performed in an iterative manner with at least two iterations and with the resulting adapted matching model in step (f) acting as the input matching model in step (b) in a next iteration.

15. The method of claim 1, wherein steps (d)-(f) are separately performed for each image level and model level, yielding an adapted matching model.

16. The method of claim 1, wherein steps (d)-(f) are performed on the second image level of the image pyramid with the higher resolution yielding adaptations on the second model level with said higher resolution, and wherein the following additional step is performed:
   (g) propagating the adaptations on the second model level with said higher resolution to the first model level with lower resolution, yielding an adapted matching model.

17. The method of claim 1, wherein step (e) comprises searching for a corresponding point in said electronic image within a neighborhood of the at least one point of said transformed model.

18. The method of claim 1, wherein step (f) comprises adapting the matching model according to a subset of the at least one determined corresponding point.

19. The method of claim 1, wherein steps (a)-(f) are performed in an iterative manner with at least two iterations and where step (f) is replaced by:
   (f) adapting the matching model according to at least one determined corresponding point in the at least one previous or current iteration, and with the resulting adapted matching model in step (f) acting as the input matching model in step (b) in a next iteration.

* * * * *

UNITED STATES PATENT AND TRADEMARK OFFICE
CERTIFICATE OF CORRECTION

PATENT NO. : 10,460,472 B2
APPLICATION NO. : 15/649326
DATED : October 29, 2019
INVENTOR(S) : Tobias Böttger et al.

Page 1 of 1

It is certified that error appears in the above-identified patent and that said Letters Patent is hereby corrected as shown below:

On the Title Page

(73) Assignee: "UNIVERSITAT LEIPZIG, Leipzig, (DE)" should be - MVTech Software GmbH, München (DE) -

Signed and Sealed this
Tenth Day of December, 2019

Andrei Iancu
*Director of the United States Patent and Trademark Office*